United States Patent
Borges et al.

(10) Patent No.: US 11,093,525 B2
(45) Date of Patent: Aug. 17, 2021

(54) TRANSACTION MERGING FOR OFFLINE APPLICATIONS

(71) Applicant: SAP SE, Walldorf (DE)

(72) Inventors: Matthew Borges, Kitchener (CA); David Brandow, Guelph (CA)

(73) Assignee: SAP SE, Walldorf (DE)

( * ) Notice: Subject to any disclaimer, the term of this patent is extended or adjusted under 35 U.S.C. 154(b) by 102 days.

(21) Appl. No.: 16/212,990

(22) Filed: Dec. 7, 2018

(65) Prior Publication Data

US 2020/0104309 A1   Apr. 2, 2020

Related U.S. Application Data

(60) Provisional application No. 62/737,529, filed on Sep. 27, 2018.

(51) Int. Cl.
*G06F 16/27* (2019.01)
*G06F 16/23* (2019.01)
*H04L 29/08* (2006.01)

(52) U.S. Cl.
CPC ........ *G06F 16/273* (2019.01); *G06F 16/2372* (2019.01); *H04L 67/1095* (2013.01); *H04L 67/1097* (2013.01)

(58) Field of Classification Search
CPC .............. G06F 16/2372; G06F 16/273; H04L 67/1095; H04L 67/1097
See application file for complete search history.

(56) References Cited

U.S. PATENT DOCUMENTS

| | | | |
|---|---|---|---|
| 7,249,118 B2 | 7/2007 | Sandler et al. | |
| 9,509,769 B2 | 11/2016 | Hurst et al. | |
| 10,169,121 B2 | 1/2019 | Vibhor et al. | |
| 10,311,082 B2 | 6/2019 | Ritter et al. | |
| 2002/0087504 A1 | 7/2002 | Thompson | |
| 2008/0172660 A1 | 7/2008 | Arning et al. | |
| 2009/0210459 A1 | 8/2009 | Nair et al. | |
| 2015/0106790 A1 | 4/2015 | Bigwood et al. | |

(Continued)

OTHER PUBLICATIONS

Giroux, M.A., "Backend for Frontends, Optimized Server Adapters, and GraphQL," from https://medium.com/@_xuorig_/backend-for-frontends-optimized-server-adapters-and-graphql-eb7c0c591c82, 4 pages, Nov. 2, 2018.

(Continued)

*Primary Examiner* — Irete F Ehichioya
*Assistant Examiner* — Xiaoqin Hu
(74) *Attorney, Agent, or Firm* — Sterne, Kessler, Goldstein & Fox P.L.L.C.

(57) ABSTRACT

Disclosed herein are system, method, and device embodiments for transaction merging for offline applications. An embodiment operates by generating an offline store, performing a first operation and a second operation of a transaction over the offline store at a first time and a second time, respectively, generating queue entries corresponding to the first operation and the second operation, respectively, generating transaction information including the first operation and the second operation based on a transaction identifier associated with the transaction; and sending the transaction information to a service provider for synchronization with a remote storage system of a backend service.

20 Claims, 8 Drawing Sheets

204

| Final ChangeSet# | Transaction ID | Operation Description |
|---|---|---|
| 1 | 1 | Create WidgetAPurchaseOrder(1) related to Customer1<br>Create WidgetAPurchaseOrder(2) related to Customer1<br>Create WidgetAPurchaseOrder(3) related to Customer1<br>Update Customer1<br>Create WidgetAPurchaseOrder(7) related to Customer1 |
| 2 | 2 | Create WidgetAPurchaseOrder(4) related to Customer2<br>Create WidgetAPurchaseOrder(5) related to Customer2 |
| 3 | 3 | CreateWidgetBPurchaseOrder |
| 4 | 4 | Create WidgetBPurchaseOrder(1) related to Customer1<br>Create WidgetBPurchaseOrder(3) related to Customer1 |
| 5 | 5 | Create Customer3<br>Create WidgetAPurchaseOrder(6) related to Customer3<br>Create WidgetAPurchaseOrder(8) related to Customer3<br>Create WidgetBPurchaseOrder(2) related to Customer3 |

206 — (row 1)
208 — (row 2)
210 — (row 3)
212 — (row 4)
214 — (row 5)

(56) References Cited

U.S. PATENT DOCUMENTS

| | | | |
|---|---|---|---|
| 2015/0142855 A1* | 5/2015 | Fast | G06F 16/27 |
| | | | 707/803 |
| 2015/0346713 A1 | 12/2015 | Gerber et al. | |
| 2017/0177687 A1* | 6/2017 | Ritter | G06F 16/93 |
| 2017/0177696 A1 | 6/2017 | Biesemann et al. | |
| 2019/0354540 A1 | 11/2019 | Stigsen | |
| 2020/0117445 A1 | 4/2020 | Wilson et al. | |

OTHER PUBLICATIONS

"Synchronize Offline Changes with SmartSync Data Framework," from https://trailhead.salesforce.com/en/content/learn/modules/mobile_sdk_offline/mobilesdk_offline_smartsync, 29 pages, printed Jul. 4, 2019.

Borges, M. et al., U.S. Appl. No. 16/586,222, filed Sep. 27, 2019, entitled "Optimizing Uploads for an Offline Scenario by Merging Modification Operations."

* cited by examiner

200

| Initial ChangeSet# | Transaction ID | Operation Description |
|---|---|---|
| 1 | 1 | Create WidgetAPurchaseOrder(1) related to Customer1 |
| 2 | 1 | Create WidgetAPurchaseOrder(2) related to Customer1 |
| 3 | 1 | Create WidgetAPurchaseOrder(3) related to Customer1 |
| 4 | 1 | Update Customer1 |
| 5 | 2 | Create WidgetAPurchaseOrder(4) related to Customer2 |
| 6 | 2 | Create WidgetAPurchaseOrder(5) related to Customer2 |
| 7 | 3 | CreateWidgetBPurchaseOrder |
| 8 | 1 | Create WidgetBPurchaseOrder(1) related to Customer1 |
| 9 | 4 | Create Customer3<br>Create WidgetAPurchaseOrder(6) related to Customer3 |
| 10 | 1 | Create WidgetAPurchaseOrder(7) related to Customer1 |
| 11 | 4 | Create WidgetAPurchaseOrder(8) related to Customer3 |
| 12 | 4 | Create WidgetBPurchaseOrder(2) related to Customer3 |
| 13 | 1 | Create WidgetBPurchaseOrder(3) related to Customer1 |

| Final ChangeSet# | Transaction ID | Operation Description |
|---|---|---|
| 1 | 1 | Create WidgetAPurchaseOrder(1) related to Customer1<br>Create WidgetAPurchaseOrder(2) related to Customer1<br>Create WidgetAPurchaseOrder(3) related to Customer1<br>Update Customer1<br>Create WidgetAPurchaseOrder(7) related to Customer1 |
| 2 | 2 | Create WidgetAPurchaseOrder(4) related to Customer2<br>Create WidgetAPurchaseOrder(5) related to Customer2 |
| 3 | 3 | CreateWidgetBPurchaseOrder |
| 4 | 4 | Create WidgetBPurchaseOrder(1) related to Customer1<br>Create WidgetBPurchaseOrder(3) related to Customer1 |
| 5 | 5 | Create Customer3<br>Create WidgetAPurchaseOrder(6) related to Customer3<br>Create WidgetAPurchaseOrder(8) related to Customer3<br>Create WidgetBPurchaseOrder(2) related to Customer3 |

Body 524:
```
POST http://localhost:8180/odata/TransactionMerge19/$batch HTTP/1.1
Content-Type: multipart/mixed; boundary=batch_709b8_1
--batch_709b8_1
Content-Type: multipart/mixed; boundary=changeset_709b8_1
--changeset_709b8_1
...
Content-ID: 1
POST Customers HTTP/1.1
RequestID: f1c453
{"ID":2,"Surname":"Doe","GivenName":"Jane"}
--changeset_709b8_1
...
Content-ID: 2
POST $1/Orders HTTP/1.1
RequestID: c43ce
{"ProductDescription":"Canoe"}
--changeset_709b8_2--
--batch_709b8_1--
```
(Body 526)

Body 530:
```
POST http://localhost:8180/odata/TransactionMerge19/$batch HTTP/1.1
Content-Type: multipart/mixed; boundary=batch_709b8_2
--batch_709b8_2
Content-Type: multipart/mixed; boundary=changeset_709b8_2
--changeset_709b8_2
...
Content-ID: 1
POST Customers(2)/Orders HTTP/1.1
RequestID: ebab75
{"ProductDescription":"Hockey Stick"}
--changeset_709b8_2
...
Content-ID: 2
POST Customers(2)/Orders HTTP/1.1
RequestID: 12d253
{"ProductDescription":"Helmet"}
--changeset_709b8_2--
--batch_709b8_2--
```
(Body 532)

Client Service 502 — Storage System 514
Service Req. 520 → Communication Network 504
Service Response 528

Service Req. 522 → Communication Network 504
Service Response 534

Service Provider 404
- Offline Data Service 420
- Remote Instance of Operations Queue 422

500

TRANSACTION MERGING FOR OFFLINE APPLICATIONS

CROSS-REFERENCE TO RELATED APPLICATIONS

This application claims the benefit of U.S. Provisional Patent Application No. 62/737,529 filed on Sep. 27, 2018, which is incorporated by reference herein in its entirety.

BACKGROUND

Generally, some applications may operate in an offline mode where modifications to a local instance of a resource are reflected locally and pushed to the corresponding remote instance of the resource at a later point in time. For instance, an application may perform operations on a local instance of a storage object, and push the operations to the centralized instance of the resource containing the storage object when the application synchronizes. Typically, when these operations are received downstream, a downstream service may assign an individual logical unit work to each operation. In some instances, individually processing the operations may be inefficient and result in poor system performance by creating disruptive bottlenecks when multiple devices return online within the same period of time.

BRIEF DESCRIPTION OF THE DRAWINGS

The accompanying drawings are incorporated herein and form a part of the specification.

FIG. 2A illustrates an example operations queue, according to some embodiments.

FIG. 2B illustrates an example representation of a result of operations performed by a transaction builder, according to some embodiments.

FIGS. 5A-5B are block diagrams of aspects of an example framework for implementing transaction merging for offline applications, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing transaction merging for offline applications in a distributed system.

Figure 1:
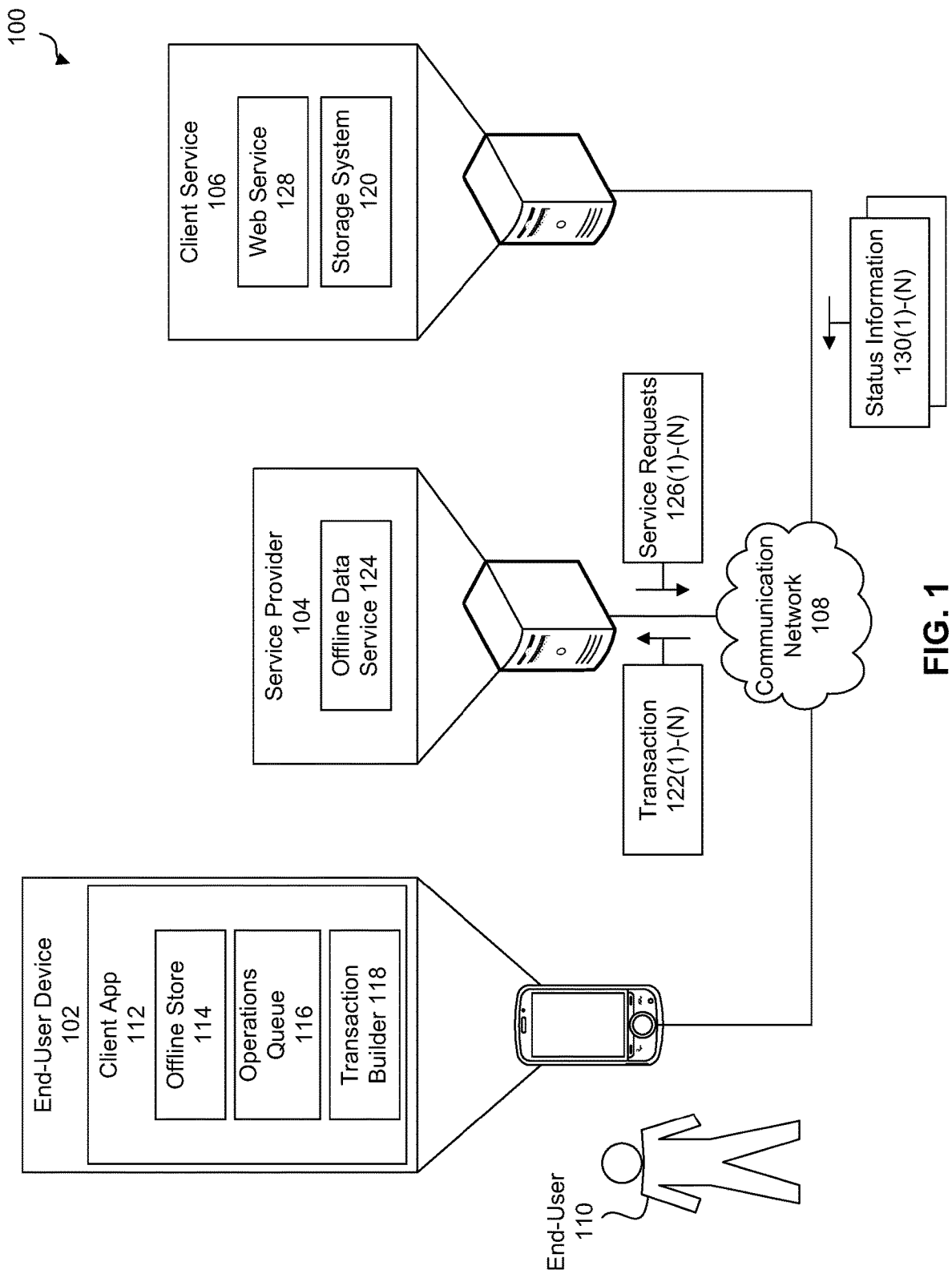
FIG. 1 is a block diagram of an example framework for implementing transaction merging for offline applications, according to some embodiments.

FIG. 1 illustrates a block diagram of an example framework for implementing transaction merging for offline applications in a distributed system 100, according to some embodiments. As illustrated in FIG. 1, the distributed system 100 includes an end-user device 102, a service provider 104, and a client service 106.

Additionally, the end-user device 102, the service provider 104, and client service 106 may communicate via a communication network(s) 108. The communication network 108 may include any combination of a private network, personal area network (PAN), Local-Area Network (LAN), Wide-Area Network (WAN), or the Internet. Further, the connection between the end-user device 102, the service provider 104, the client service 106, and the communication network 108 may be a wireless connection (e.g., Bluetooth or other short range wireless technology, cellular, Wi-Fi connection, etc.), or a wired connection (e.g., Ethernet, universal serial bus (USB), etc.), or a combination thereof.

As illustrated in FIG. 1, the end-user device 102 may be associated with an end-user 110. Some examples of an end-user device 102 include smart phones and mobile communication devices; tablet computing devices; wearable computing devices; desktops, laptops, netbooks and other portable computers, appliance, IoT (internet of things) device, and/or any other device capable of communicating with the service provider 104 or client service 106.

As shown in FIG. 1, the end-user device 102 may include a client application 112, an offline store 114, an operations queue 116, and a transaction builder 118. As used herein, in some embodiments, a "client application" may refer to any application or software (e.g., client, agent, application, mobile application, desktop application, or module) operable to run on any device and interact with the service provider 104 or the client service 106. Further, aspects of the client application 112 may be provided based on services and/or data provided by the client service 106 via the service provider 104.

Further, the client application 112 may be developed using a software development kit (SDK) associated with the service provider 104. As used herein, and in some embodiments, a "software development kit" may refer to a collection of tools that may be used to develop software application targeting a specific platform. For instance, the SDK may provide functions and libraries permitting the client application 112 to interact with the service provider 104. As an example, the SDK may include logic for sending application programming interface (API) calls to an API of the service provider 104.

The offline store 114 may be initialized to permit the client application 112 to run in an offline mode. As used herein, and in some embodiments, an "offline mode" may refer to the ability of one or more aspects of the client application 112 to operate absent data connectivity. Offline usage of the client application 112 may enable the end-user 110 to continue use of the client application 112 when there is intermittent network coverage, supports business processes that may be executed by the end-user 110 while the client application 112 is offline, and/or improves performance by accessing offline data instead of sending data requests to the service provider 104. In some embodiments, the end-user may determine when the client application 112 may determine when to enter the online or offline mode. In some other embodiments, the client application 112 may be configured to periodically determine the data connectivity status between the end-user device 102 and the service provider 104 or the client service 106, and determine the mode based on the data connectivity status. For example, the client application 112 may transition from the online mode to the offline mode based on determining that the end-user device 102 has lost data connectivity to the service provider 104.

The offline store 114 stores data the client application 112 can access while executing in an offline mode. For instance, the offline store 114 may be initialized to include data from a storage system 120 (e.g., a database, a file system, a content management system, etc.) of the client service 106 that the client application 112 employs. In addition, the client application 112 may request data from the offline store 114 while the client application 112 is in the offline mode. Further, modifications to the data may be performed within the offline store 114 while the client application 112 is in the offline mode. For example, the client application 112 may create or update a storage object within the offline store. As another example, the client application 112 may create or update a relationship between storage objects within the offline store 114. Additionally, when the client application 112 is online, the service provider 104 may synchronize the offline store 114 and the storage system 120 of the client service 106.

As used herein, and in some embodiments, the term a "database" refers to an organized collection of data. In some embodiments, a database may include a plurality of data tables comprising data values (e.g., alphanumeric strings, integers, decimals, floating points, dates, times, binary values, Boolean values, and/or enumerations). Some examples of databases include columnar databases, relational databases, key-store databases, graph databases, and document stores.

The operations queue 116 may store modification operations performed over the offline store 114. In some embodiments, the operations queue 116 may be stored as one or more database tables of the offline store 114. Further, the operations queue 116 may store operation entries that map a modification operation identifier, a transaction identifier, and a modification operation. For example, as further described with respect to FIG. 2A, database row information of the operations queue 116 may include a modification operation identifier identifying the sequential position of the modification operation, a transaction identifier identifying a transaction including the modification operation, and the modification operation performed over the offline store 114. Further, the transaction identifier may be used to identify operations that can be grouped into a logical unit of work executed at the client service 106. In some embodiments, the transaction identifier may be stored in a custom header table of the database.

Additionally, the client application 112 may be configured to determine the transaction identifier for an operation entry of the operations queue 116. In some embodiments, the client application 112 may be configured to determine an entity or object of the offline store 114 associated with an operation over the offline store 114, and set the transaction identifier to an identifier corresponding to the entity/object. For instance, the client application 112 may determine that an operation pertains to a storage object of the offline store 114 based upon one or more attributes of the operation. As a result, the client application 112 may set the transaction identifier to a unique identifier of the storage object. In some other embodiments, a string identifier may be programmatically provided within the client application 112. For example, the client application 112 may be configured to set the transaction identifier of one or more operations to a string identifier provided within the code of the client application 112.

The transaction builder 118 may identify operation entries within the operations queue 116 that should be grouped into the same logical unit of work when executed by the client service 106. In some embodiments, the transaction builder 118 may determine the operation entries that should be grouped into the same logical unit of work based upon the transaction identifiers of the operations queue 116.

For instance, the transaction builder 118 may identify the transaction identifier of the first database row entry of the operations queue 116, identify other database row entries in the operations queue 116 having the same transaction identifier, and generate a transaction 122(1) including the modification operations associated with the first row entry and the other row entries identified as being associated with the transaction identifier. Further, the transaction builder 118 may determine other transactions 122(2)-(N) by performing the same operation with respect to the remaining row entries of the operations queue 116.

Additionally, in some embodiments, the client application 112 may send the transactions 122(1)-(N) to the service provider 104 for continued processing. In some other embodiments, the client application 112 may send the transactions 122(1)-(N) directly to the client service 106. Further, in some embodiments, the client application 112 and/or the client service 106 may employ the Open Data Protocol (OData). As such, the client application 112 may generate the transactions 122(1)-(N) as OData changesets. As used herein, a "changeset" refers to an atomic unit of work that is made up of an unordered group of one or more of insert, update, or delete operations in accordance with OData.

As described in further detail herein, in some embodiments, the transaction builder 118 may determine that a first modification operation associated with a transaction identifier should not be combined with a second modification operation associated with the transaction identifier. In particular, the transaction builder 118 may bypass combining a first modification operation and a second modification operation based upon a protocol (e.g., OData) applied within the distributed system 100 and/or a type of modification operation used to build a relationship between resources associated with the first modification operation or the second modification operation.

OData enables the creation of HTTP-based data services, which allow resources identified using Uniform Resource Identifiers (URIs) and defined in an abstract data model, to be published and edited by Web clients using simple HTTP messages. OData is intended to be used to expose and access information from a variety of sources including, but not limited to, relational databases, file systems, content management systems, and traditional Web sites.

At the core of OData are feeds, which are collections of typed entries. Each entry represents a structured record with a key that has a list of Properties of primitive or complex types. Entries can be part of a type hierarchy and may have related entries and related feeds through links. In addition to feeds and entries, OData services can expose service operations, which are simple, service-specific functions that accept input parameters and return entries or complex/primitive values.

The OData service interface has a number of operations that have uniform meaning across the resources it can act on. These operations include retrieve, create, update and delete and they respectively map to the GET, POST, PUT and DELETE HTTP methods. OData clients may query an OData service to retrieve a feed, entry, or service document by issuing an HTTP GET request against its URI. Further, OData clients may insert, update, and delete a feed, entry or service document by issuing a POST, PUT or DELETE request against its URI. In other words, OData services expose OData constructs (i.e., feeds, entries, properties within entries, links, service documents, and metadata documents) via URIs in one or more representation formats, which can be acted upon (query, update, insert, delete, and so on) by clients using basic HTTP requests.

In some embodiments, the client application 112 may be an OData client employing OData operations to interact with an OData service associated with client service 106. In an example embodiment employing OData, when a new entity is created by the client application 112 in an offline mode, the client application 112 will generate a local entity ID. In some embodiments, the local entity ID is a 20 byte hash value. In OData, an entity ID is used for consuming an associated entity. When the new entity is uploaded to the client service 106 during the synchronization process, the client service 106 generates system-wide entity ID which replaces the local entity ID within the client application 112. This process may also be performed when the transaction builder 118 processes the operations queue 116. That is, operation entries in the operations queue 116 including the local entity ID will be updated to use the system-wide entity ID when it becomes available.

For example, suppose a first modification operation creates a database entity and a second modification operation references the created entity using a local entity ID. The client application 112 may generate the first transaction 122(1) including the first modification operation. Further, the client application 112 may send the first transaction 122(1) to the service provider 104 for playback at the client service 106, and receive the system-wide entity ID for the newly created entity in response. In addition, the client application 112 may replace the local entity ID with the system-wide entity ID within the second modification operation of the operations queue 116 to form an updated second modification operation. For example, the client application 112 may update the modification operation to reference the system-wide entity ID instead of the local entity ID. Further, the client application 112 may generate the second transaction 122(2) including the updated second modification operation, and send the second transaction 122(2) to the service provider 104 for playback at the client service 106.

In some other embodiments, the service provider 104 may maintain a local copy of the operations queue 116 using the transactions 122. For example, the client application 112 may send the first transaction 122(1) and the second transaction 122(2) to the service provider 104 for playback at the client service 106. Further, the service provider 104 may receive the system-wide entity ID for the newly created entity in response to playback of an operation associated with the first transaction 122(1) at the client service 106. In addition, the service provider 104 may replace the local entity ID with the system-wide entity ID within the second modification operation of transaction 122(2) to form an updated second modification operation. For example, the service provider 104 may update the modification operation to reference the system-wide entity ID instead of the local entity ID within the local copy of the operations queue 116.

In an embodiment employing OData, a modification operation may be used to build a relationship via a POST to navigation link operation, a deep insert operation, a $link operation, a $ref operation, a bind operation, explicitly setting dependent referential constraint properties, or a reference to a temporary local content identifier (local entity ID) which acts as a placeholder for a permanent entity identifier (i.e., system-wide entity ID) assigned by an OData service. Further, in some examples, when the client application 112 builds a relationship via a bind operation, a link request operation, or explicitly setting dependent referential constrain properties, the transaction builder 118 may determine that a first modification operation and a second modification operation associated with the relationship should not be grouped within the same transaction 122 based upon a version of OData used within the distributed system 100. This is due in part to the fact that in particular versions of OData, a local entity ID cannot be referenced within the body (i.e., payload) of a request.

For instance, if a first modification operation creates a database entity and a second modification operation references the created entity via a local entity ID in a bind operation, the transaction builder 118 may not combine the first modification operation and second modification operation to generate the transaction 122(1). Instead, the transaction builder 118 may generate the first transaction 122(1) based on the first modification operation. Further, the client application 112 may send the first transaction 122(1) to the service provider 104 for playback at the client service 106, and receive a system-wide entity identifier for the newly created entity. In addition, the client application 112 may replace the local entity ID with the system-wide entity ID within the second modification operation of the operations queue 116 to form an updated second modification operation. Further, the client application 112 may generate the second transaction 122(2) based on the updated second modification operation, and send the second transaction 122(2) to the service provider 104 for playback at the client service 106. In some other examples, the service provider 104 may replace the local entity ID with the system-wide entity ID within the second modification operation to form an updated second modification operation. In particular, as detailed in FIGS. 4A-4B and 5A-5B, the service provider 104 may maintain a local copy of the operations queue 116. Furthermore, upon receipt of the system-wide entity ID from the client service 106, the service provider 104 may replace the local entity ID with the system-wide entity ID within the second modification operation information of the local copy of the operations queue 116.

As described above, in some embodiments, the transaction builder 118 may also determine that the first modification operation and the second modification operation should not be grouped within the logical unit of work when the relationship between the modification operations is formed using a $link or setting a dependent referential constraint property.

Table 1 presents an example of a bind modification operation. In some embodiments, a bind operation is used to create or modify a relationship between an existing entity and another entity (e.g., an entity to be created in response to the request). Further, the example represents a portion of the body of a request to create a new purchase order for a customer. In some instances, the bind operation may be in a POST request to create a new entity, or in a PUT/PATCH request to update an entity. In a POST request, a bind operation may be used to relate entities create a single-valued relationship or a collection-valued relationship. In a PUT/PATCH request a bind may be used to update single-valued relationship. As described herein, in some embodiments, the client application 112 might not group the modification operation creating the account of the customer and the modification operation creating the purchase order into one logical unit of work. As illustrated in Table 1, in some embodiments, a bind operation may be performed by including an entity ID (i.e., Customers(1)) in the payload of the request that creates a relationship between the customer and the purchase order. Further, the transaction builder 118 might not be able to generate a valid request by replacing the entity identifier of the customer with a content identifier reference because the entity identifier is included the request payload. For instance, some versions of the OData protocol (e.g., OData version 2) do not permit a content identifier reference within the payload of a request payload.

TABLE 1

{
    ID: 1,
    Customer: Customers(1)
}

As described herein, in some embodiments, a $links operation is used to create/modify a relationship between existing entities. In some instances, a $link operation may be used within a PUT request to create or modify a relationship for a single-valued relationship. In some other instances, a $link operation may be used within a POST request to create a relationship for a collection-valued relationship. For example, to create a new purchase order for a customer using $links, the client application 112 may POST to the URL "Customers(1)/$links/Orders" a request with a body that includes "Orders(1)", and PUT to the URL "Orders(1)/$links/Customer" a request with a body that includes Customers(1). Further, as described herein, in some embodiments, the client application 112 might not group the modification operations into one logical unit of work. For example, the transaction builder 118 might not be able to generate a valid request by replacing the entity identifiers of the customer or order with content identifier references because the entity identifiers are included the request payloads.

Table 2 presents an example of a modification operation that explicitly sets a dependent referential constraint property. For example, in order to create a new purchase order for a customer by explicitly setting a dependent referential constraint property, the client application 112 may update the purchase order to include a "customer identifier" property of the purchase order that is set to an entity identifier of the customer. Further, as described herein, in some embodiments, the client application 112 may not group the modification operations into the same logical unit of work. As illustrated in Table 2, in some embodiments, explicitly setting a dependent referential constraint property may be performed by including an entity identifier of the customer in a payload of the request to create the relationship between the customer and the purchase order. Further, the transaction builder 118 might not be able to generate a valid request by replacing the identifier of the customer with a content identifier reference because the entity identifier is included the request payload.

For instance, if the operation that creates the customer has not been sent to the client service 106, the customer will not have been assigned an entity identifier. As such, in some embodiments, the transaction builder 118 will be unable to generate a valid request by replacing the identifier of the customer with an entity identifier of the customer because the customer has not been assigned a valid entity identifier. In some examples, an entity identifier (e.g., Customers(1)) may include the entity set (e.g., Customers) followed by the key property in parentheses (e.g., (3)). Further, in some embodiments, the customer will not be assigned a key property until the client service 106 processes the operation that creates the customer.

TABLE 2

{
    ...
    CustomerID: 1
}

In some embodiments, the client application 112 and the service provider 104 may employ a database replication technology to synchronize the offline store 114 and the storage system 120 of the client service 106. For example, the client application 112 and the service provider may use a data replication technology to transmit the transactions 122 in order to synchronize the operations queue 116 and a copy of the operations queue maintained by the service provider 104. In particular the client application 112 and the service provider 104 may employ the MobiLink protocol to synchronize the offline store 114, operations queue 116, and/or the storage system 120. Additionally, the database replication technology may utilize delta queries to synchronize only new and modified objects of the offline store 114, operations queue 116, and/or the storage system 120.

Further, the client application 112 may perform a flush method with respect to the offline store 114 that submits the transactions 122(1)-(N) to the service provider 104. In addition, the client application 112 may perform a refresh method with respect to the offline store 114 that pulls changes to the storage system 120 from the service provider 104, and commits the changes to the offline store 114. In some embodiments, the flush and refresh methods may be provided by an SDK associated with the service provider 104.

The service provider 104 may provide application services and core services to the client application 112 and the client service 106. For example, the service provider 104 may be a platform as a service (PaaS) or an application platform as a service (aPaaS). Additionally, use of the service provider 104 may allow the client service 106 to scale with business needs and delegate infrastructure and system operations to the service provider 104. Some examples of core services include application analytics, application resources, data integration, HTTP configuration, HTTPS configuration, lifecycle management, push notifications, security services, system health monitoring, etc. Further, the service provider 104 may be a multi-tenant system. As used herein, and in some embodiments, the term "multi-tenant system" refers to those systems in which various elements of hardware and software of the system may be shared by one or more customers (e.g., the operator of the client service 106) of the multi-tenant system operator.

As illustrated in FIG. 1, the service provider 104 may include an offline data service 124 that enables the client application 112 to access data of the client service 106 without requiring data connectivity to the client service 106. In some embodiments, the offline data service 124 may be configured to initialize the offline store 114 of the client application 112, maintain delta information identifying changes made to the offline store 114 and the storage system 120, respectively, and/or update the offline store 114 and the storage system 120 based on the delta information. Further, the offline data service 124 may perform middle-tier caching of data from the storage system 120. For example, the offline data service 124 may cache common user data to reduce the amount of data that needs to be synchronized between the storage system 120 and the offline stores of different users (e.g., the end-user 110).

Further, the offline data service 124 may receive the transactions 122(1)-(N) from the client application 112 and generate service requests 126(1)-(N) corresponding to the transactions 122(1)-(N) For example, the first service request 126(1) may correspond to the first transaction 122(1), the Nth service request 126(N) may correspond to the Nth transaction 122(N), and so forth. In addition, the service provider 104 may send the service requests 126(1)-(N) to the client service 106.

In some embodiments, the client service 106 may be an OData service (e.g., an OData producer), and the service requests 126(1)-(N) may be OData changesets. As such, the offline data service 124 may generate OData changesets based on the transactions 122(1)-(N) and the OData specification, and send the OData changesets to the client service 106. In some other embodiments, the client service 106 may not be an OData service and the transactions 122(1)-(N) may be OData operations. As such, the service provider 104 may generate the service requests 126(1)-(N) based on converting the OData operations of the transactions 122(1)-(N) to a format associated with the client service 106. For example, the client service 106 may be a SQL system. As such, the service provider 104 may convert the OData operations of the transactions 122 to SQL operations, and map the changesets to SQL transactions. As another example, the client service 106 may be a NoSQL system. As such, the service provider 104 may convert the OData operations of the transactions 122 to NoSQL operations, and map the changesets to NOSQL transactions.

As illustrated in FIG. 1, the client service 106 may include a web service 128 and the storage system 120. In some embodiments, the web service 128 and/or storage system 120 may receive the service requests 126(1)-(N) from the service provider 104. Further, the web service 128 and/or storage system 120 may update the storage system 120 based upon the service requests 126(1)-(N). For example, the storage system 120 may receive the service requests 126(1)-(N), and update the contents of the storage system 120 in view of the modification operations included in the service requests 126(1)-(N). Further, the client service 106 may send status information 130(1)-(N) (e.g., acknowledgements or error messages) indicating the success or failure of the playback of the service requests 126(1)-(N). For example, the first status information 130(1) may correspond to the success or failure of the first service request 126(1), the Nth status information 130(N) may correspond to the success or failure of the Nth service request 126 (N), and so forth.

FIG. 2A illustrates an example operations queue (e.g., operations queue 116), according to some embodiments. As illustrated in FIG. 2A, the operations queue 200 may include a plurality of operation entries 202(1)-(13). Further, each operation entry may include a changeset identifier indicating the sequential position of performance of the associated operation, a transaction identifier identifying a transaction including the associated operation, and an operation description describing the corresponding operation. In some embodiments, operation description may be used to playback the operation at a remote storage system (e.g., the storage system 120).

FIG. 2B illustrates an example representation of a result of operations performed by a transaction builder (e.g., the transaction builder 118) on the operations queue 200, according to some embodiments. As illustrated in FIG. 2B, a transaction builder may generate a transaction request 206 including the operation entries 202(1)-(4) and 202(10). Further, a client application (e.g., client application 112) may send transaction request 206 as transaction information (e.g., the transaction 122(1)) to the service provider 104.

Additionally, the transaction builder may generate a transaction request 208 including the operation entries 202(5)-(6). Further, the client application may send the transaction request 208 as a transaction (e.g., the transaction 122(2)) to the service provider 104. Further, the client application may send the transaction request 210 including the operation entry 202(7) to the service provider as a transaction (e.g., the transaction 122(3)).

In addition, the transaction builder may generate a transaction request 212 including the operation entries 202(8) and 208(13). Further, the client application may send the transaction request 210 as a transaction (e.g., the transaction 122(4)) to the service provider 104. In some embodiments, the operation entries 202(8) and 208(13) are sent separately from the operation entries of transaction request 206 because the operation entries 202(8) and 208(13) reference an entity that is created in between the performance of the operations of the transaction request 206 and the operations of the transaction request 212.

Further, the transaction builder may generate a transaction request 214 including the operation entries 202(9), 202(11), and 202(12). Further, the client application may send the transaction request 214 as a transaction (e.g., the transaction 122(5)) to the service provider 104.

Figure 3:
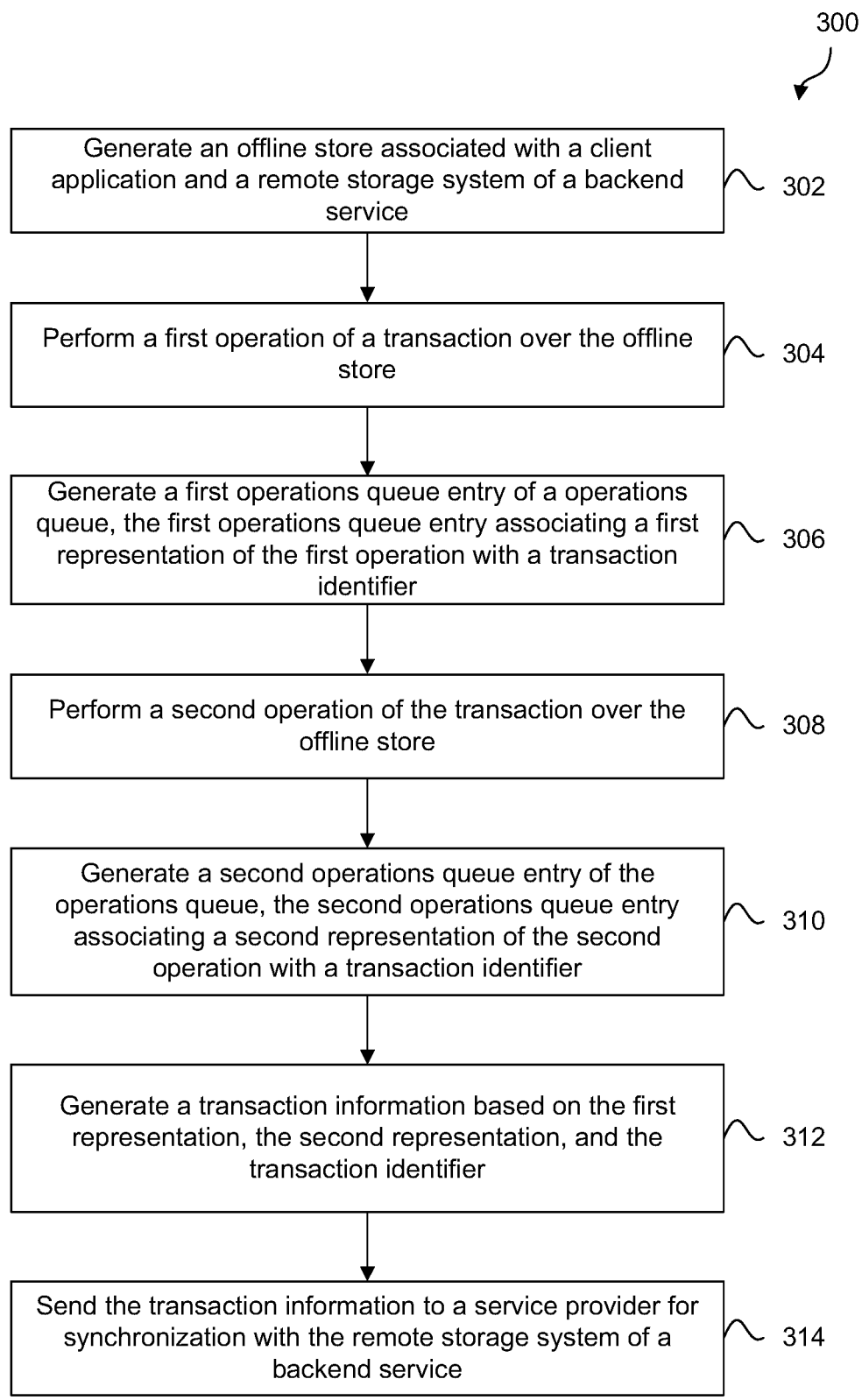
FIG. 3 is a flowchart illustrating a process for transaction merging for offline applications, according to some embodiments.

FIG. 3 is a flowchart of a method 300 for implementing transaction merging for offline applications, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

In 302, the end-user device may generate an offline store associated with a client application and a remote storage system of a backend service. For example, the end-user device 102 may generate the offline store 114 corresponding to the storage system 120 of the client service 106. In some embodiments, the offline data service 124 may manage creation of the offline store 114. For instance, the offline data service 124 may send the initial contents of the storage system 120 (e.g., a remote database) to the end-user device 102.

In 304, the end-user device may perform a first operation over the offline store. For instance, the client application 112 may perform a first operation that creates or modifies an entity and/or object of the offline store 114 as a part of a transaction. As an example, the client application 112 may create a first purchase order corresponding to a customer on the offline store 114. In some embodiments, the first operation may be a create operation, update operation, or delete operation over a database.

In 306, the end-user device may generate a first operations queue entry of an operations queue, where the first operations queue entry associates a representation of the first operation with a transaction identifier. For example, the client service 112 may add a first entry to the operations queue 116 that includes a transaction identifier associated with the transaction comprising the first operation, and a description of the first operation.

In 308, the end-user device may perform a second operation over the offline store. For instance, the client application 112 may perform a second operation that creates or modifies an entity and/or object of the offline store 114 as a part of the transaction. As an example, the client application 112 may create a second purchase order corresponding to the customer on the offline store 114. In some embodiments, the second operation may be a create operation, update operation, or delete operation over a database.

Further, even though first operation and the second operation may belong to the same transaction, the second operation may be performed at a later time than the first operation. For example, one or more other operations belonging to other transactions may be performed over the offline store 114 between the execution of the first operation and the second operation.

In 310, the end-user device may generate a second operations queue entry of the operations queue, where the second operations queue entry associates a representation of the second operation with a transaction identifier. For example, the client service 112 may add a second entry to the operations queue 116 that includes the transaction identifier associated with the transaction comprising both the first operation and the second operation, and a description of the second operation.

In some embodiments, the operations queue 116 may include one or more other row entries entered between the first row entry and the second row entry. Further, the other row entries may correspond to operations performed over the offline store 114 between the performance of the first operation and the performance of the second operation.

In 312, the end-user device may generate transaction information based on the first operations queue entry, the second operations queue entry, and the transaction identifier. For example, the transaction builder 118 may identify the first row entry and the second row entry based on the shared transaction identifier. Further, the transaction builder 118 may generate the transaction 122(1) based on the first row entry and the second row entry. In some embodiments, the transaction 122(1) may include descriptions of the first operation and the second operation. Although method 300 combines two operations associated with a common transaction identifier, the embodiments described herein are applicable to any number of operations associated with the same transaction identifier.

Further, the descriptions may be used to playback the operations at the storage system 120. For example, the client service 106 may playback the first operation and the second operation over a database (i.e., the storage system 120).

In 314, the end-user device may send the transaction information to a service provider for synchronization with a remote storage system of the backend service. For example, the client application 112 may send the transaction 122(1) to the service provider 104. Further, upon receipt of the transaction 122(1), the offline data service 124 may generate the service request 126(1), and send the service request 126(1) to the client service 106. In addition, the client service 106 may playback the contents of the service request 126(1) in order to update the storage system 120 to reflect the performance of the first operation and the second operation.

In some embodiments, the service provider 104 may be an OData producer. As such, the service request 126(1) may be generated in accordance with the OData protocol. For example, the service request 126(1) may include an OData changeset representing the first operation and the second operation according to the OData protocol.

Figure 4A:
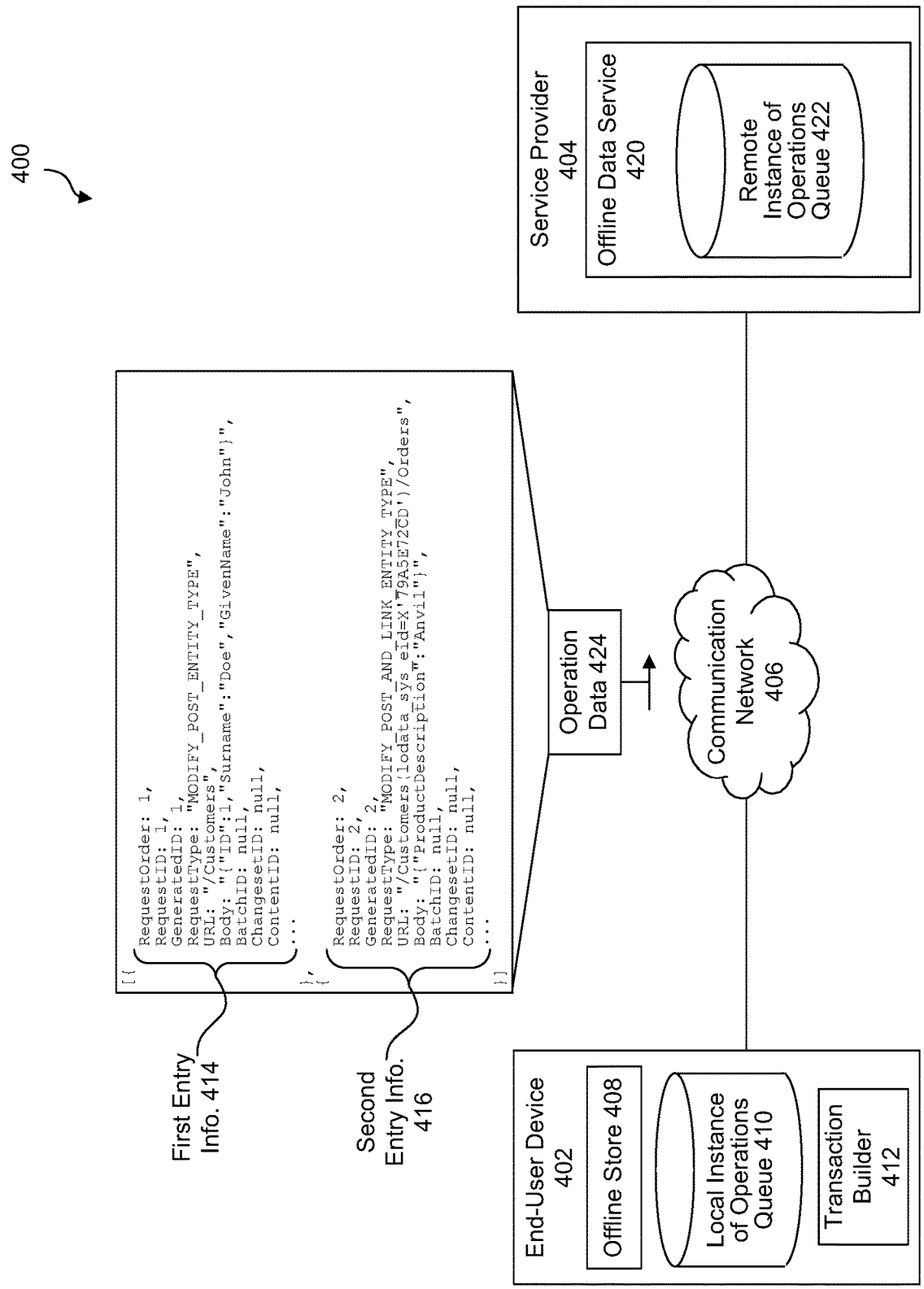
FIG. 4A-4B are block diagrams of aspects of an example framework for implementing transaction merging for offline applications, according to some embodiments.
Figure 4B:
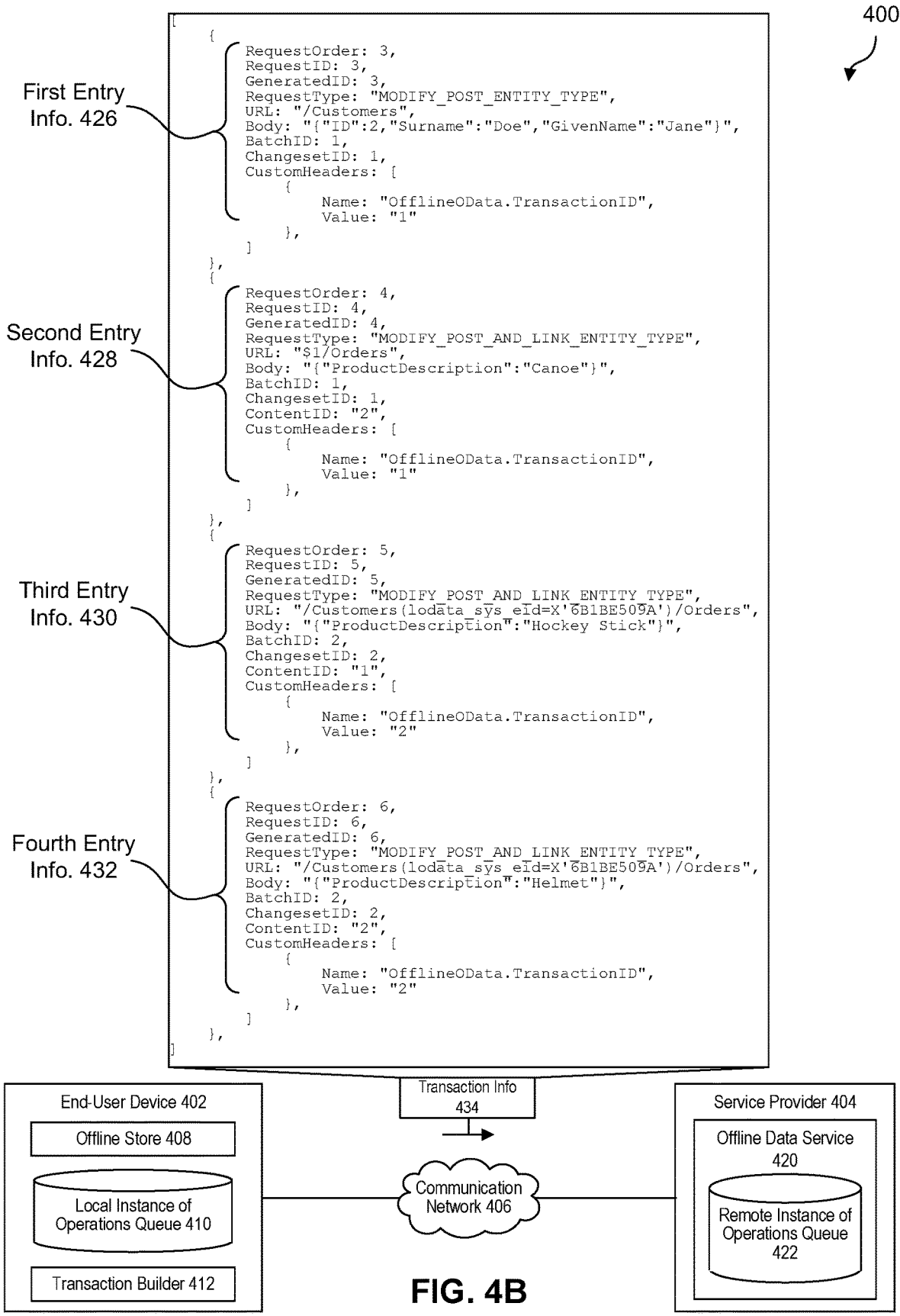

FIGS. 4A-4B illustrate block diagrams of aspects of an example framework for implementing transaction merging for offline applications in a distributed system 400, according to some embodiments. As illustrated in FIGS. 4A-4B, the distributed system 400 includes an end-user device 402 (e.g., the end-user device 102) and a service provider 404 (e.g., the service provider 104).

Additionally, the end-user device 402 and the service provider 404 may communicate via a communication network(s) 406. The communication network 406 may include any combination of a private network, personal area network (PAN), Local-Area Network (LAN), Wide-Area Network (WAN), or the Internet. Further, the connection between the end-user device 402, the service provider 404, and the communication network 406 may be a wireless connection (e.g., Bluetooth or other short range wireless technology, cellular, Wi-Fi connection, etc.), or a wired connection (e.g., Ethernet, universal serial bus (USB), etc.), or a combination thereof.

As shown in FIG. 4A, the end-user device 402 includes an offline store 408, a local instance of an operations queue 410 (e.g., the operations queue 116), and a transaction builder 412 (e.g., the transaction builder 118). As described in detail herein, the transaction builder 412 may identify operation entries (e.g., the operation entries 202) within the operations queue 410 that should be grouped into the same logical unit of work when executed by a client service (e.g., the client service 106) associated with the service provider 404.

In some embodiments, the end-user device 402 might not employ the transaction builder 412. As an example, the end-user device 402 may perform a plurality of operations outside of a transaction. For instance, the end-user device 402 may perform a first operation which creates a user account associated with a user John Doe. Further, the end-user device 402 may generate first entry information 414 within the local instance of the operations queue 410 corresponding to the creation of the user account for John Doe.

In addition, the end-user device 402 may perform a second operation representing the sale of a purchase item to John Doe's the newly-created user account. Further, the end-user device 402 may generate second entry information 416 within the local instance of the operations queue 410 corresponding to the purchase order.

As described in detail herein, the end-user device 402 may synchronize the offline store 408 and a corresponding storage system (e.g., the storage system 120) of a client service via the service provider 404. For example, the service provider 404 may include an offline data service 420 (e.g., the offline data service 124) for synchronizing the offline store 408 and a storage system. Further, the offline data service 420 may include a remote instance of the operations queue 422 that corresponds to the local instance of operations queue 410. In addition, the end-user device 402 may synchronize the local instance of the operations queue 410 and the remote instance of the operations queue 422. As illustrated in FIG. 4A, the end-user device 42 may synchronize the local instance of the operations queue 410 and the remote instance of the operations queue 422 by transmitting operations data 424 to the service provider 404. In some examples the operations data 424 may be sent to the service provider 404 as JavaScript Object Notation (JSON) data, eXtensible Markup Language (XML) data, binary protocol data, or the like.

In some embodiments, the end-user device 402 may use the MobiLink protocol to synchronize the local instance of the operations queue 410 and the remote instance of the operations queue 422. For example, the local instance of the operations queue 410 and the remote instance of the operations queue 422 may be databases. Further, the local instance of the operations queue 410 may include database tables storing information associated with the operations performed over the offline store 408. As such, an individual operations queue entry may include one or more rows of the database tables. In some embodiments, the columns of the database tables may include a request order number, a request order identifier, a generation identifier, a request type, a URL, body information corresponding to an operation request to be processed by a client service, a batch identifier, a changeset identifier, a content identifier, and a custom header. In some other embodiments, the columns may further include status information, a refresh index, a current ETag (entity tag), a next ETag, a next media ETag, a content type, a repeat time, and repeat token information. In some embodiments, as shown in FIGS. 4A-4B and 5A-5B, the columns of the database tables may correspond to a key of a key-value pair in information sent as JSON data.

In addition, the operations data 424 may include information corresponding to one or more rows stored in the local instance of an operations queue 410. In some embodiments, the one or more rows may describe operations performed over the offline store 408. For instance, as illustrated in FIG. 4A, the operations data 424 may include the first entry information 414 pertaining to the creation of the user account for John Doe, and the second entry information 416 pertaining to the purchase order associated with John Doe's user account. Upon receipt of the operations data 424, the offline data service 420 may update the remote instance of the operations queue 422 using the operations data 424. For example, the offline data service 420 may update the remote instance of the operations queue 422 to include the first entry information 414 and the second entry information 416.

In some embodiments, as described in detail herein, the end-user device 402 may employ the transaction builder 412 to identify operation entries within the operations queue 410 that should be grouped into the same logical unit of work when executed by a client service. As an example, the end-user device 402 may perform a first transaction including two operations over the offline store 408, and a second transaction including two operations over the offline store 408.

The first transaction may include a first operation which creates a user account associated with a user Jane Doe, and a second operation representing the sale of a purchase item to the newly-created user account of Jane Doe. Further, the end-user device 402 may generate first entry information 426 and second entry information 428 within the local instance of the operations queue 410 corresponding to the creation of the user account and the purchase order, respectively. In addition, the second transaction may include third and fourth operations corresponding to the sale of two purchase items to the newly-created user account of Jane Doe. Further, the end-user device 402 may generate third entry information 430 and fourth entry information 432 entries within the local instance of the operations queue 410 corresponding to the purchase orders, respectively.

Prior to synchronizing the local instance of the operations queue 410 and the remote instance of the operations queue 422, the transaction builder 412 may identify operation entries within the local instance of the operations queue 410 that should be grouped into the same logical unit of work when executed by the client service. In some embodiments, the transaction builder 412 may modify the local instance of the operations queue 410 to include information indicating the operations that should be grouped into the same logical unit of work when executed by the corresponding client service, and instructions for sending the operations as service requests (e.g., the service request 126) to the client service.

For example, when the operation queue entries (i.e., the entry information 426-432) are initially added to the operations queue 410 during the first and second transactions, the row information of the operation queue entries corresponding to the batch identifier, the changeset identifier, and the content identifier columns may be set to NULL for the operation queue entries associated with the transactions.

In addition, when the operation queue entries (i.e., the entry information 426-432) are initially added to the operations queue 410 during the first and second transactions, the row information of the operation queue entries corresponding to the custom header column may include the respective transaction identifier of the transactions. For example, the row value for the custom header column for the operation queue entries associated with the first transaction may include information indicating that the transaction identifier is '1', and the row value for the custom header column for the operation queue entries associated with the second transaction may include information indicating that the transaction identifier is '2'.

Further, as described in detail herein, the transaction builder 412 may evaluate the operation queue entries of the transactions to determine the operations that should be grouped into the same logical unit of work. For example, the transaction builder 412 may determine the operations that should be grouped into the same logical unit of work based on transaction identifier information included in the custom header column, and/or information included in the request type column. In addition, the transaction builder 412 may set the batch identifier, the change set identifier, and/or the content identifier of the entries of the local instance of the operations queue 410 to reflect the results of the evaluation by the transaction builder 412.

For example, as shown in FIG. 4B, the transaction builder 412 may set the changeset identifier of the first entry information 426 and the second entry information 428 to '1' to indicate to the offline data service 420 that the corresponding operations should be grouped into a first logical unit of work at the client service. In addition, as shown in FIG. 4B, the transaction builder 412 may set the batch identifier of the first entry information 426 and the second entry information 428 to '1' to indicate to the offline data service 420 that the corresponding operations should be sent to client service in a first service request.

Further, as shown in FIG. 4B, the transaction builder 412 may set the changeset identifier of the second entry information and the third entry information to '2' to indicate to the offline data service 420 that the corresponding operations should be grouped into a second logical unit of work at the client service. In addition, the transaction builder 412 may set the batch identifier of the operations queue entries to '2' to indicate to the offline data service 420 that the corresponding operations should be sent to client service in a second service request.

In some embodiments, the optimization process performed by the transaction builder 412 may set a content identifier of the operation queue entries (i.e., the entry information 426-432). In some embodiments, the value of the content identifier may uniquely identify the corresponding operation and entry information within its transaction. For instance, as illustrated in FIG. 4B, the value of the content identifier for the first entry information 426 may be set to '1', and the value of the content identifier for the second entry information 428 may be set to '2'. In addition, the value of the content identifier for the third entry information 430 may be set to '1', and the value of the content identifier for the fourth entry information 432 may be set to '2'.

In some embodiments, the optimization process performed by the transaction builder 412 may update the URL. For example, the URL of the second entry information 428 may initially be set to the value "/Customers (lodata_sys_eid=X'6B1BE509A')/Orders". However, "Customers(lodata_sys_eid=X'6B1BE509A')" may be a temporary placeholder identifier associated with Jane Doe's newly created user account. As such, the second entry information 428, the third entry information 430, and the fourth entry information 432 may initially include a URL value including the temporary placeholder in order to represent that the corresponding purchases were made by Jane Doe's newly created user account.

Additionally, as illustrated in 4B, the optimization process may update the URL of the second entry information 428 from "/Customers(lodata_sys_eid=X'6B1BE509A')/Orders". For example, the optimization process may update the URL of the second entry information 428 from "/Customers (lodata_sys_eid=X'6B1BE509A')/Orders" to "$1/Orders". In some embodiments, the temporary placeholder identifier may be replaced with the content identifier of the first entry information in which Jane Doe's user account is created.

Table 3 presents an example of the first entry information 426, the second entry information 428, the third entry information 430, and the fourth entry information 432 prior to the optimization process.

TABLE 3

[
  {
    RequestOrder: 3,
    RequestID: 3,
    Status: "LOCAL_REQUEST_UNSENT",
    RefreshIndex: 9223372036854775807,
    GeneratedID: 3,
    RequestType: "MODIFY_POST_ENTITY_TYPE",
    URL: "/Customers",
    ThisETag: null,
    NextETag: "W/"lodata_sys_etagf34aee40-e91c-4aa4-a96c-a0d96a5ff27f"",
    NextMediaETag: null,
    ContentType: null,
    Body: "{"ID":2,"Surname":"Doe","GivenName": "Jane"}",
    BatchID: null,
    ChangesetID: null,
    ContentID: null,
    RepeatTime: null,
    RepeatToken: null,
    CustomHeaders: [
      {
        Name: "OfflineOData.TransactionID",
        Value: "1"
      },
    ]
  },
  {
    RequestOrder: 4,
    RequestID: 4,
    Status: "LOCAL_REQUEST_UNSENT",
    RefreshIndex: 9223372036854775807,
    GeneratedID: 4,
    RequestType: "MODIFY_POST_AND_LINK_ENTITY_TYPE",
    URL: "/Customers(lodata_sys_eid= X'6B1BE509A')/Orders",
    ThisETag: null,
    NextETag: "W/"lodata_sys_etaga7dfdaa1-99ca-4948-9a54-

TABLE 3-continued

62861a50a972"",
    NextMediaETag: null,
    ContentType: null,
    Body: "{"ProductDescription": "Canoe"}",
    BatchID: null,
    ChangesetID: null,
    ContentID: null,
    RepeatTime: null,
    RepeatToken: null,
    CustomHeaders: [
      {
        Name: "OfflineOData.TransactionID",
        Value: "1"
      },
    ]
  },
  {
    RequestOrder: 5,
    RequestID: 5,
    Status: "LOCAL_REQUEST_UNSENT",
    RefreshIndex: 9223372036854775807,
    GeneratedID: 5,
    RequestType: "MODIFY_POST_AND_LINK_ENTITY_TYPE",
    URL: "/Customers(lodata_sys_eid= X'6B1BE509A')/Orders",
    ThisETag: null,
    NextETag: "W/"lodata_sys_etag42c77939-9554-4cf8-af92-335bea04e49e"",
    NextMediaETag: null,
    ContentType: null,
    Body: "{"ProductDescription":"Hockey Stick"}",
    BatchID: null,
    ChangesetID: null,
    ContentID: null,
    RepeatTime: null,
    RepeatToken: null,
    CustomHeaders: [
      {
        Name: "OfflineOData.TransactionID",
        Value: "2"
      },
    ]
  },
  {
    RequestOrder: 6,
    RequestID: 6,
    Status: "LOCAL_REQUEST_UNSENT",
    RefreshIndex: 9223372036854775807,
    GeneratedID: 6,
    RequestType: "MODIFY_POST_AND_LINK_ENTITY_TYPE",
    URL: "/Customers(lodata_sys_eid= X'6B1BE509A')/Orders",
    ThisETag: null,
    NextETag: "W/"lodata_sys_etage4c0d32d-2b50-42ab-8564-7383cb1a9c8d"",
    NextMediaETag: null,
    ContentType: null,
    Body: "{"ProductDescription":"Helmet"}",
    BatchID: null,
    ChangesetID: null,
    ContentID: null,
    RepeatTime: null,
    RepeatToken: null,
    CustomHeaders: [
      {
        Name: "OfflineOData.TransactionID",
        Value: "2"
      },
    ]
  },
]

Table 4 presents an example of the first entry information 426, the second entry information 428, the third entry information 430, and the fourth entry information 432 after the optimization process.

TABLE 4

```
[
  {
    RequestOrder: 3,
    RequestID: 3,
    Status: "LOCAL_REQUEST_UNSENT",
    RefreshIndex: 9223372036854775807,
    GeneratedID: 3,
    RequestType: "MODIFY_POST_ENTITY_TYPE",
    URL: "/Customers",
    ThisETag: null,
    NextETag: "W/"lodata_sys_etag4cd8bac9-ba4b-4c0c-9633-
      41d86c2c78ec"",
    NextMediaETag: null,
    ContentType: null,
    Body: "{"ID":2,"Surname":"Doe","GivenName":"Jane"}",
    BatchID: 1,
    ChangesetID: 1,
    ContentID: "1",
    RepeatTime: 2018-10-16T19:09:04.483,
    RepeatToken: f1c453c035494dcc912ad0663dd25719,
    CustomHeaders: [
      {
        Name: "OfflineOData.TransactionID",
        Value: "1"
      },
    ]
  },
  {
    RequestOrder: 4,
    RequestID: 4,
    Status: "LOCAL_REQUEST_UNSENT",
    RefreshIndex: 9223372036854775807,
    GeneratedID: 4,
    RequestType: "MODIFY_POST_AND_LINK_ENTITY_TYPE",
    URL: "$1/Orders",
    ThisETag: null,
    NextETag: "W/"lodata_sys_etag0f37d1a8-e8b8-4055-9932-
      c132354dded4"",
    NextMediaETag: null,
    ContentType: null,
    Body: "{"ProductDescription": "Canoe"}",
    BatchID: 1,
    ChangesetID: 1,
    ContentID: "2",
    RepeatTime: 2018-10-16T19:09:04.483,
    RepeatToken: c43ce09a19fe43218348d4c4e7cb50cb,
    CustomHeaders: [
      {
        Name: "OfflineOData.TransactionID",
        Value: "1"
      },
    ]
  },
  {
    RequestOrder: 5,
    RequestID: 5,
    Status: "LOCAL_REQUEST_UNSENT",
    RefreshIndex: 9223372036854775807,
    GeneratedID: 5,
    RequestType: "MODIFY_POST_AND_LINK_ENTITY_TYPE",
    URL: "/Customers(lodata_sys_eid= X'6B1BE509A')/Orders",
    ThisETag: null,
    NextETag: "W/"lodata_sys_etag0ffecd80-c152-40d4-9dc7-
      56aef751287f"",
    NextMediaETag: null,
    ContentType: null,
    Body: "{"ProductDescription":"Hockey Stick"}",
    BatchID: 2,
    ChangesetID: 2,
    ContentID: "1",
    RepeatTime: 2018-10-16T19:09:04.483,
    RepeatToken: ebab75e13f684468080214589162cfc97,
    CustomHeaders: [
      {
        Name: "OfflineOData.TransactionID",
        Value: "2"
      },
    ]
  },
  {
```

TABLE 4-continued

```
    RequestOrder: 6,
    RequestID: 6,
    Status: "LOCAL_REQUEST_UNSENT",
    RefreshIndex: 9223372036854775807,
    GeneratedID: 6,
    RequestType: "MODIFY_POST_AND_LINK_ENTITY_TYPE",
    URL: "/Customers(lodata_sys_eid=X'6B1BE509A')/Orders",
    ThisETag: null,
    NextETag: "W/"lodata_sys_etag01fede31-80fd-42a3-a6de-
      b588dff1ef80"",
    NextMediaETag: null,
    ContentType: null,
    Body: "{"ProductDescription":"Helmet"}",
    BatchID: 2,
    ChangesetID: 2,
    ContentID: "2",
    RepeatTime: 2018-10-16T19:09:04.483,
    RepeatToken: 12d253afd3264b65a16231e728f607df,
    CustomHeaders: [
      {
        Name: "OfflineOData.TransactionID",
        Value: "2"
      },
    ]
  },
]
```

In some embodiments, once the transaction builder 412 completes the optimization process (e.g., the optimization method 300), the end-user device 402 may send a transaction information 434 (e.g., the transaction 122(1)) including the operations queue information to the service provider 404. For example, as shown in FIG. 4B, the transaction information 434 may include the first entry information 426 corresponding to the creation of the user account for Jane Doe, the second entry information 428 corresponding to the first purchase order associated with Jane Doe's user account, the third entry information 430 corresponding to the second purchase order associated with Jane Doe's user account, and the fourth entry information 432 corresponding to the third purchase order associated with Jane Doe's user account.

Figure 5A:
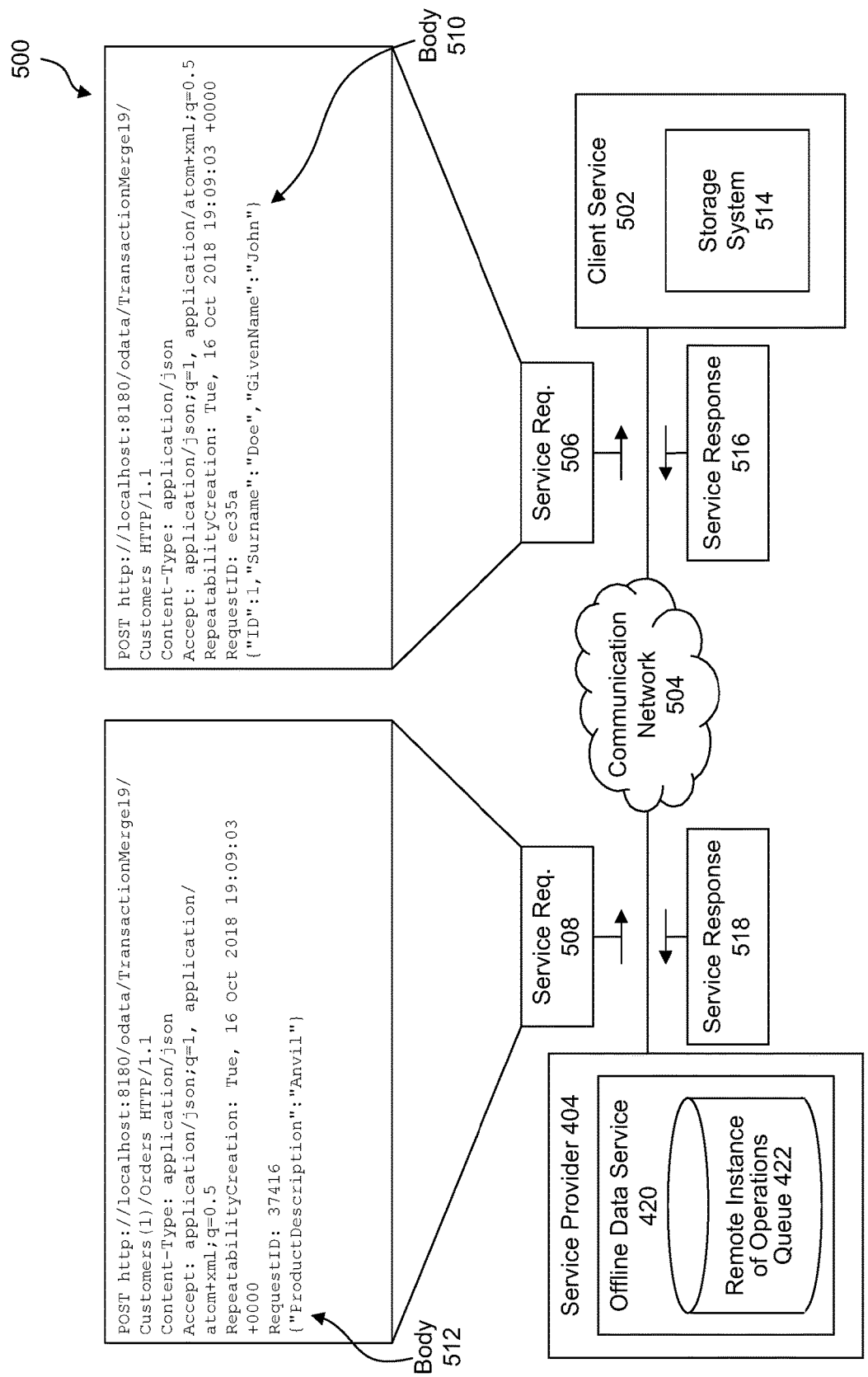

FIGS. 5A-5B illustrates a block diagram of aspects of an example framework for implementing transaction merging for offline applications in a distributed system 500, according to some embodiments. As illustrated in FIGS. 5A-5B, the distributed system 500 includes the service provider 404 and a client service 502 (e.g., the client service 106).

Additionally, the service provider 404 and client service 502 may communicate via a communication network(s) 504. The communication network 504 may include any combination of a private network, personal area network (PAN), Local-Area Network (LAN), Wide-Area Network (WAN), or the Internet. Further, the connection between the service provider 404, client service 502, and the communication network 504 may be a wireless connection (e.g., Bluetooth or other short range wireless technology, cellular, Wi-Fi connection, etc.), or a wired connection (e.g., Ethernet, universal serial bus (USB), etc.), or a combination thereof.

As illustrated in FIG. 5A, the service provider 404 may send service requests 506 and 508 to the client service 502. For example, upon receipt of the operations data 424 (not shown in FIG. 5), the offline data service 420 may update the remote instance of the operations queue 422 to include the first entry information 414 and the second entry information 416. Additionally, the offline data service 420 may generate the first service request 506 and the second service request 508 based on the first entry information 414 and the second entry information 416, and send the service requests 506 and 508 to the client service 502.

In some embodiments, the remote instance of the operations queue 422 may be an in-memory data representation of the local instance of the operations queue 410. For example, during a synchronization process, the end-user device 402 may upload the local instance of the operations queue 410 to the offline data service 420 via the transaction information 434. Additionally, or alternatively, during a synchronization process, the end-user device 402 may stream one or more entries of the local instance of the operations queue 410 to the offline data service 420 via the transaction information 434.

In some other embodiments, the remote instance of the operations queue 422 may be a persistent database, and the entry information (e.g., the first entry information 414 and the second entry information 416) may be database table row information from the tables of the database. In addition, the rows of the first entry information 414 and the second entry information 416 may be used to generate the first service request 506 and the second service request 508, respectively. For instance, as shown in FIG. 5A, the body value of the first entry information 414 may be used as the body 510 of the first service request 506. In addition, as shown in FIG. 5A, the body value of the second entry information 416 may be used as the body 516 of the second service request 508.

As shown in FIG. 5A, the client service 502 may include a storage system 514 (e.g., the storage system 120). Further, upon receipt of the service requests 506 and 508, the client service 502 may process the service requests 506 and 508, and update the storage system 514 in accordance with the service requests 506 and 508. For instance, the client service 502 may receive the service request 506, and update the storage system 514 to include a new account for John Doe. In addition, the client service 502 may return service responses 516 and 518 indicating the success or failure of the service requests 506 and 508, respectively. In some embodiments, the service responses 516 and 518 may include response codes indicating the success or failure of the service requests 506 and 508.

As illustrated, in FIG. 5B, the service provider 404 may send service requests 520 and 522 to the client service 502. For example, upon receipt of the transaction information 434 (not shown in FIG. 5B), the offline data service 420 may update the remote instance of the operations queue 422 to include the first entry information 426, the second entry information 428, the third entry information 430, and the fourth entry information 432. Additionally, the offline data service 420 may generate the first service request 520 and the second service request 520 based on the transaction information 434, and send the service requests 520 and 522 to the client service 502.

In some embodiments, the remote instance of the operations queue 422 may be a database, and the entry information (e.g., the first entry information 426, the second entry information 428, the third entry information 430, and the fourth entry information 432) may be database table row information from the tables of the database. In addition, the rows of the first entry information 414 and the second entry information may be used to generate the first service request 520 based on the remote instance of the operations queue 422. For instance, the offline data service 420 may determine that the first entry information 426 and the second entry information 428 include information that should be sent in the same service request. For example, the offline data service 420 may determine that the first entry information 426 and the second entry information 428 should be sent in the same service request based at least in part on the batch identifier and/or the changeset identifier. Consequently, as shown in in FIG. 5B, the offline data service 420 may generate the first service request 520 to include at least the body 524 of the first entry information 426 and the body 526 of the second entry information 428.

Further, upon receipt of the service request 520, the client service 502 may process the service request 520, and update the storage system 514 in accordance with the service request 520. For instance, the client service 502 may receive the service request 520, and update the storage system 514 to include a new account for Jane Doe and the purchase of a canoe by Jane Doe's account.

In addition, the client service 502 may return the service response 528 indicating the success or failure of the service request 520. In some embodiments, the service response 528 may include a response code indicating the success or failure of the service request 520, and/or a permanent identifier corresponding to the newly created account of Jane Doe. Further, the offline data service 420 may receive the service response 528, and update the third entry information 430 and the fourth entry information 432 to include the permanent identifier given that the third entry information 430 and fourth entry information 432 correspond to operations performed with respect to Jane Doe's newly created account.

Further, the offline data service 420 may determine that the third entry information 430 and the fourth entry information 432 include information that should be sent in the same service request. For example, the offline data service 420 may determine that the third entry information 430 and the fourth entry information 432 should be sent in the same service request based at least in part on the batch identifier and/or the changeset identifier. Consequently, as shown in FIG. 5B, the offline data service 420 may generate the second service request 520 to include at least the body 530 of the third entry information 430 and the body 532 of the fourth entry information 432.

Further, upon receipt of the service request 520, the client service 502 may process the service request 520, and update the storage system 514 in accordance with the service request 520. For instance, the client service 502 may receive the service request 520, and update the storage system 514 to include the purchase of a hockey stick and a helmet by Jane Doe's account. As such, the storage system 514 will now reflect transaction operations performed over the offline store 408 (not shown in FIG. 5B) while the end-user device 402 (not shown in FIG. 5B) is in an offline mode. In addition, the client service 502 may return service response 534 indicating the success or failure of the service request 522.

Figure 6:
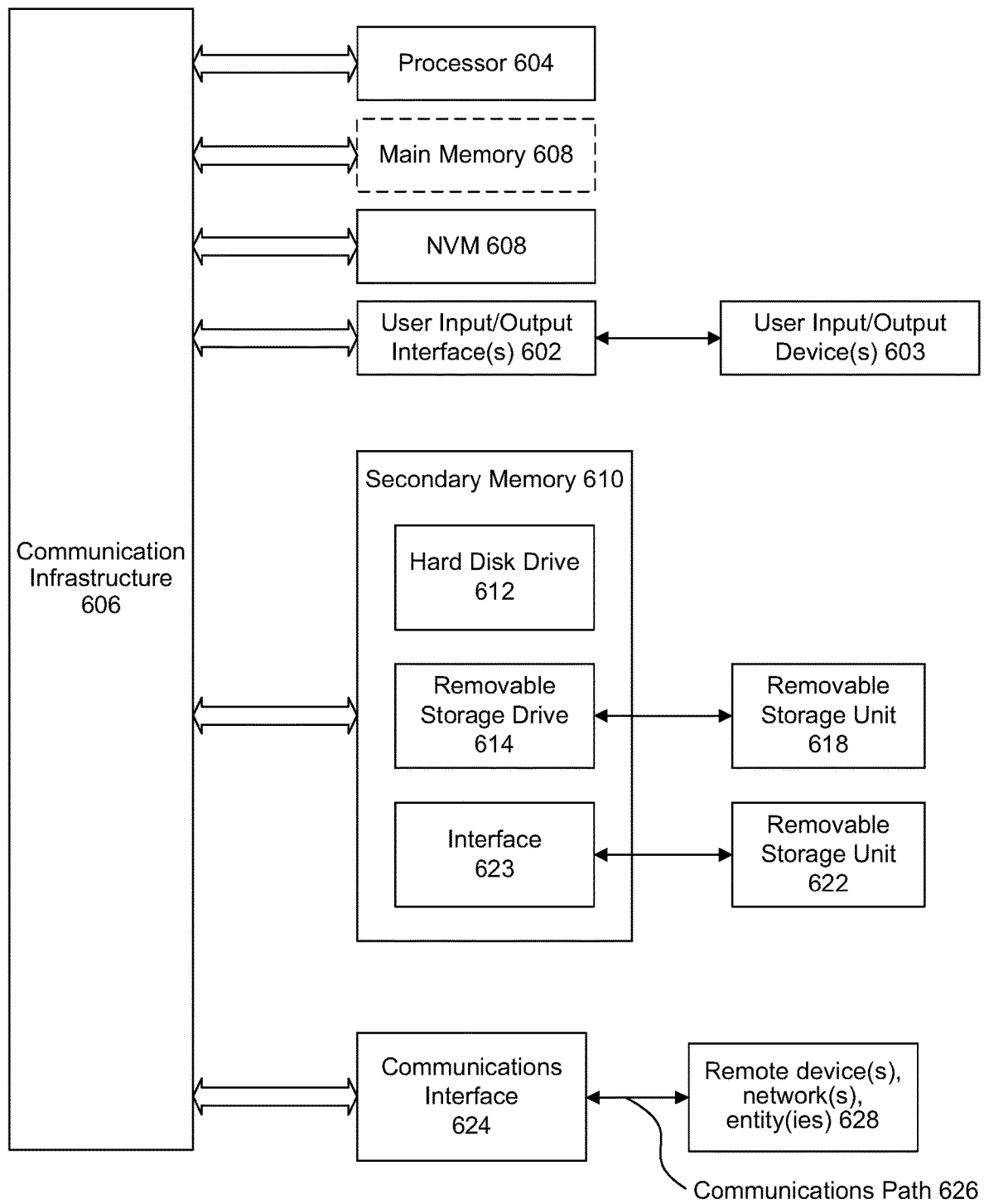
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   performing, by at least one processor, a first modification operation over an offline store within a distributed system;
   generating, by the at least one processor, a first operation entry in an operations queue, wherein the first operation entry associates a representation of the first modification operation with a first transaction identifier;
   performing, by the at least one processor, a second modification operation over the offline store;
   generating, by the at least one processor, a second operation entry in the operations queue, wherein the second operation entry associates a representation of the second modification operation with the first transaction identifier;
   generating, by the at least one processor and based on the first operation entry and the second operation entry in the operations queue, a first Open Data Protocol (OData) changeset comprising the first modification operation and excluding the second modification operation based on a version of OData used within the distributed system and the second modification operation referencing a resource created by the first modification operation;
   generating, by the at least one processor and based on the first operation entry and the second operation entry in the operations queue, a second OData changeset comprising the second modification operation and excluding the first modification operation based on the version of OData used within the distributed system and the second modification operation referencing the resource created by the first modification operation; and
   sending, by the at least one processor, the first OData changeset and the second OData changeset to an OData service provider within the distributed system thereby synchronizing the offline store with a remote storage system in the distributed system.

2. The method of claim 1, further comprising:
   generating, by the at least one processor, the offline store, wherein the offline store is associated with a client application executing in an offline mode.

3. The method of claim 1, wherein the first OData changeset represents a logical unit of work.

4. The method of claim 1, wherein the first OData changeset is a portion of a database including a representation of the operations queue.

5. The method of claim 1, further comprising:
   performing, by the at least one processor, a third modification operation over the offline store;
   generating, by the at least one processor, a third operation entry in the operations queue, wherein the third operation entry associates a representation of the third modification operation with a second transaction identifier that is different from the first transaction identifier;
   performing, by the at least one processor, a fourth modification operation over the offline store;
   generating, by the at least one processor, a fourth operation entry in the operations queue, wherein the fourth operation entry associates a representation of the fourth modification operation with the second transaction identifier;
   generating, by the at least one processor and based on the third operation entry and the fourth operation entry in the operations queue, a third OData changeset comprising the third modification operation and the fourth modification operation based on the third modification operation and the fourth modification operation being associated with the same transaction identifier and the fourth modification operation failing to reference a resource created by the third modification operation; and
   sending, by the at least one processor, the third OData changeset to the OData service provider within the distributed system thereby synchronizing the offline store with the remote storage system in the distributed system.

6. The method of claim 1, wherein the operations queue comprises a database table.

7. The method of claim 1, wherein the version of OData is OData version 2.

8. The method of claim 1, wherein the second modification operation comprises an OData bind operation or an OData $links operation.

9. The method of claim 1, wherein the second modification operation comprises setting a dependent referential constraint property.

10. A non-transitory computer-readable medium having instructions stored thereon that, when executed by at least one computing device, cause the at least one computing device to perform operations comprising:
   performing a first modification operation over an offline store within a distributed system;
   generating a first operation entry in an operations queue, wherein the first operation entry associates a representation of the first modification operation with a first transaction identifier;
   performing a second modification operation over the offline store;
   generating a second operation entry in the operations queue, wherein the second operation entry associates a representation of the second modification operation with the first transaction identifier;
   generating, based on the first operation entry and the second operation entry in the operations queue, a first Open Data Protocol (OData) changeset comprising the first modification operation and excluding the second modification operation based on a version of OData used within the distributed system and the second modification operation referencing a resource created by the first modification operation;

generating, based on the first operation entry and the second operation entry in the operations queue, a second OData changeset comprising the second modification operation and excluding the first modification operation based on the version of OData used within the distributed system and the second modification operation referencing the resource created by the first modification operation; and sending the first OData changeset and the second OData changeset to an OData service provider within the distributed system thereby synchronizing the offline store with a remote storage system in the distributed system.

11. The non-transitory computer-readable medium of claim 10, the operations further comprising:

generating the offline store, wherein the offline store is associated with a client application executing in an offline mode.

12. The non-transitory computer-readable medium of claim 10, wherein the first OData changeset represents a logical unit of work.

13. The non-transitory computer-readable medium of claim 10, wherein the first OData changeset is a portion of a database including a representation of the operations queue.

14. The non-transitory computer-readable medium of claim 10, the operations further comprising:

performing a third modification operation over the offline store;

generating a third operation entry in the operations queue, wherein the third operation entry associates a representation of the third modification operation with a second transaction identifier that is different from the first transaction identifier;

performing a fourth modification operation over the offline store;

generating a fourth operation entry in the operations queue, wherein the fourth operation entry associates a representation of the fourth modification operation with the second transaction identifier;

generating, based on the third operation entry and the fourth operation entry in the operations queue, a third OData changeset comprising the third modification operation and the fourth modification operation based on the third modification operation and the fourth modification operation being associated with the same transaction identifier and the fourth modification operation failing to reference a resource created by the third modification operation; and sending the third OData changeset to the OData service provider within the distributed system thereby synchronizing the offline store with the remote storage system in the distributed system.

15. A system comprising:

a memory; and at least one processor coupled to the memory and configured to:

perform a first modification operation over an offline store within a distributed system;

generate, within an operations queue, a first operation entry that associates a representation of the first modification operation with a first transaction identifier;

perform a second modification operation over the offline store;

generate, within the operations queue, a second operation entry that associates a representation of the second modification operation with the first transaction identifier;

generate, based on the first operation entry and the second operation entry in the operations queue, a first Open Data Protocol (OData) changeset comprising the first modification operation and excluding the second modification operation based on a version of OData used within the distributed system and the second modification operation referencing a resource created by the first modification operation;

generate, based on the first operation entry and the second operation entry in the operations queue, a second OData changeset comprising the second modification operation and excluding the first modification operation based on the version of OData used within the distributed system and the second modification operation referencing the resource created by the first modification operation; and send the first OData changeset and the second OData changeset to an OData service provider within the distributed system thereby synchronizing the offline store with a remote storage system in the distributed system.

16. The system of claim 15, wherein the first OData changeset represents a logical unit of work.

17. The system of claim 15, wherein the first OData changeset is a portion of a database including a representation of the operations queue.

18. The system of claim 15, wherein the at least one processor is further configured to:

perform a third modification operation over the offline store;

generate, within the operations queue, a third operation entry that associates a representation of the third modification operation with a second transaction identifier that is different from the first transaction identifier;

perform a fourth modification operation over the offline store;

generate, within the operations queue, a fourth operation entry that associates a representation of the fourth modification operation with the second transaction identifier;

generate, based on the third operation entry and the fourth operation entry in the operations queue, a third OData changeset comprising the third modification operation and the fourth modification operation based on the third modification operation and the fourth modification operation being associated with the same transaction identifier and the fourth modification operation failing to reference a resource created by the third modification operation; and send the third OData changeset to the OData service provider within the distributed system thereby synchronizing the offline store with the remote storage system in the distributed system.

19. The system of claim 15, wherein the at least one processor is further configured to generate the offline store, wherein the offline store is associated with a client application executing in an offline mode.

20. The system of claim 15, wherein the operations queue comprises a database table.

* * * * *